Oct. 15, 1929.                L. D. SOUBIER                1,731,947
                               GLASS FEEDER
                          Filed June 20, 1927      3 Sheets-Sheet 1
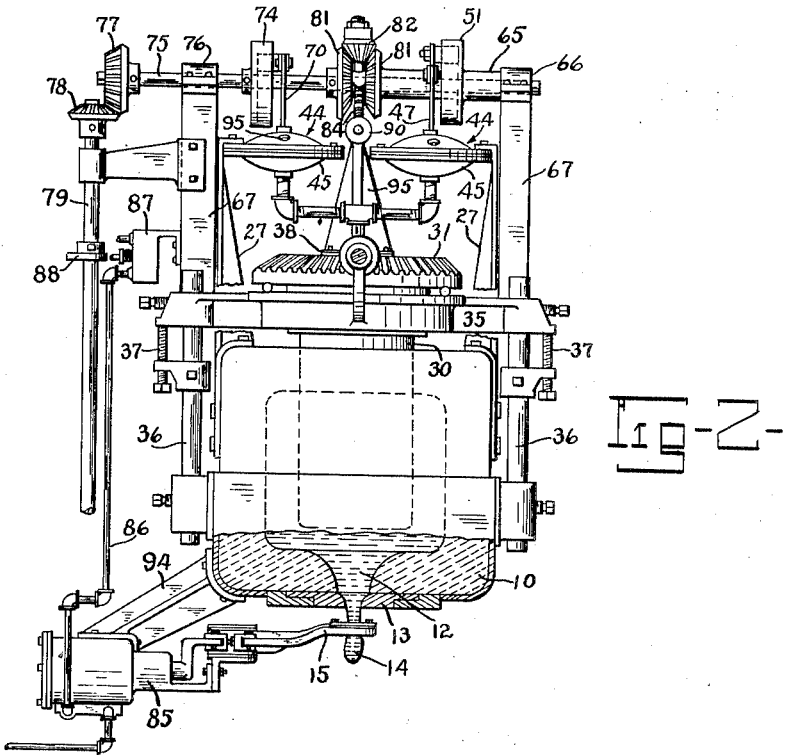
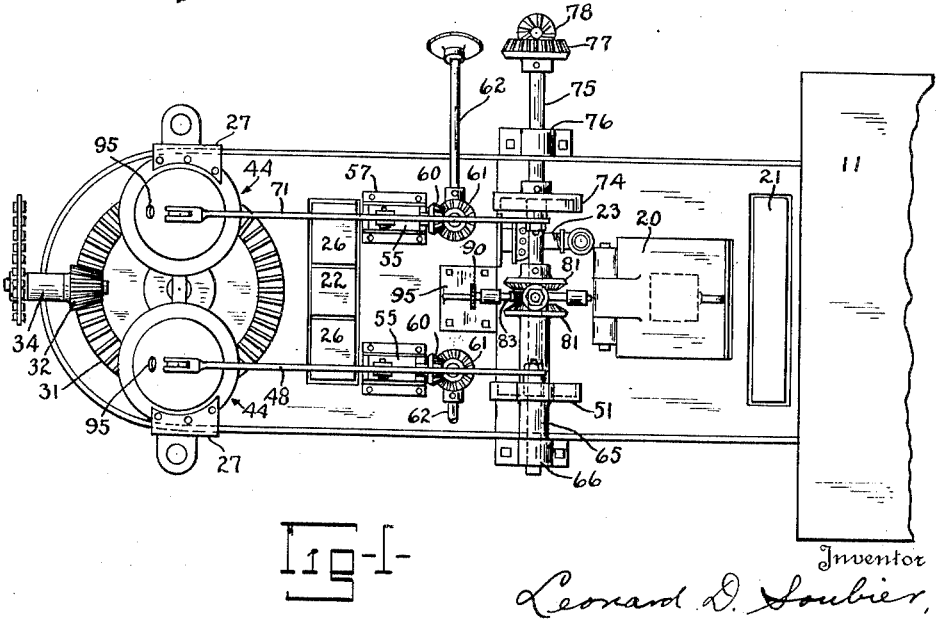

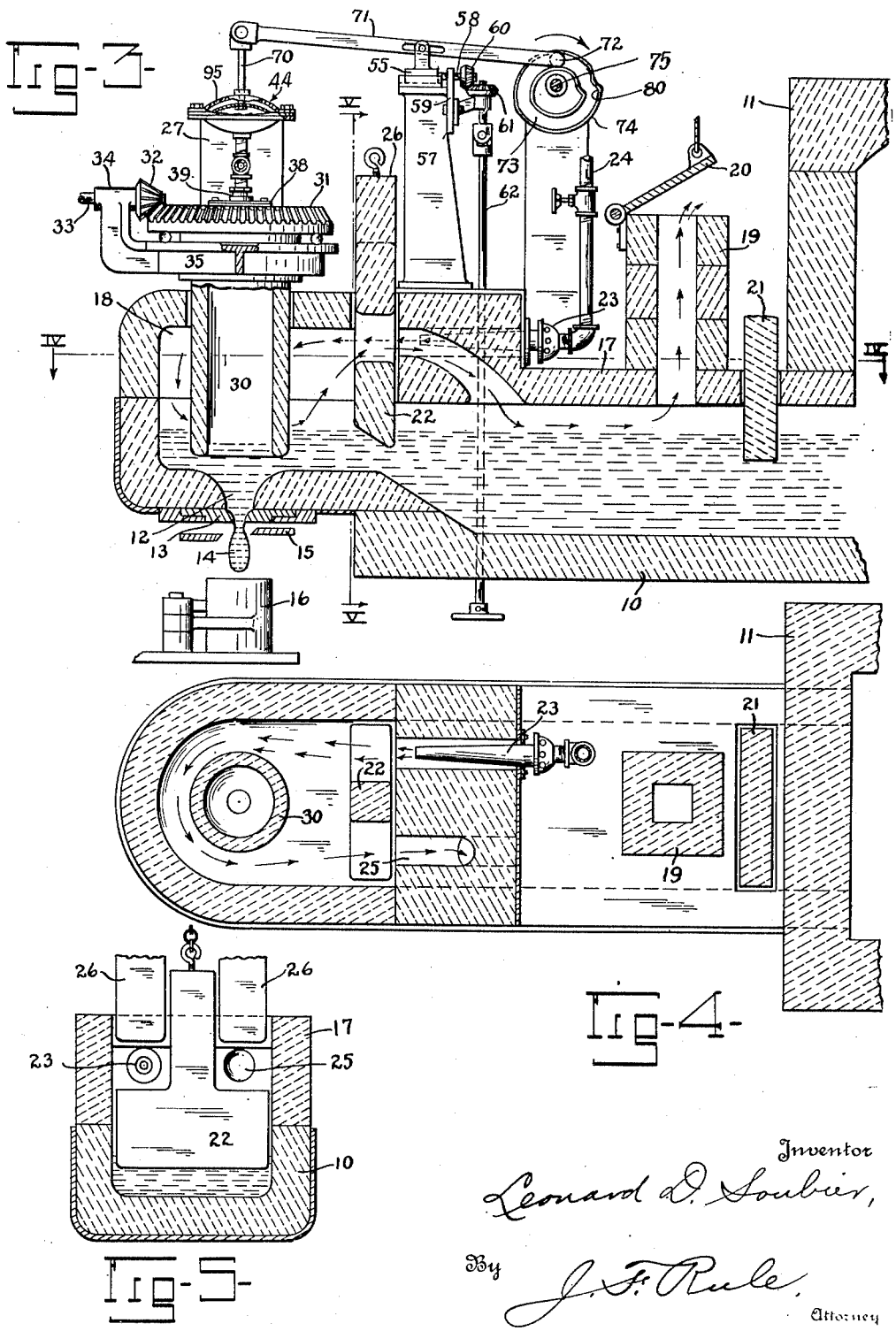

Oct. 15, 1929.                    L. D. SOUBIER                    1,731,947
                                  GLASS FEEDER
                     Filed June 20, 1927          3 Sheets-Sheet 3
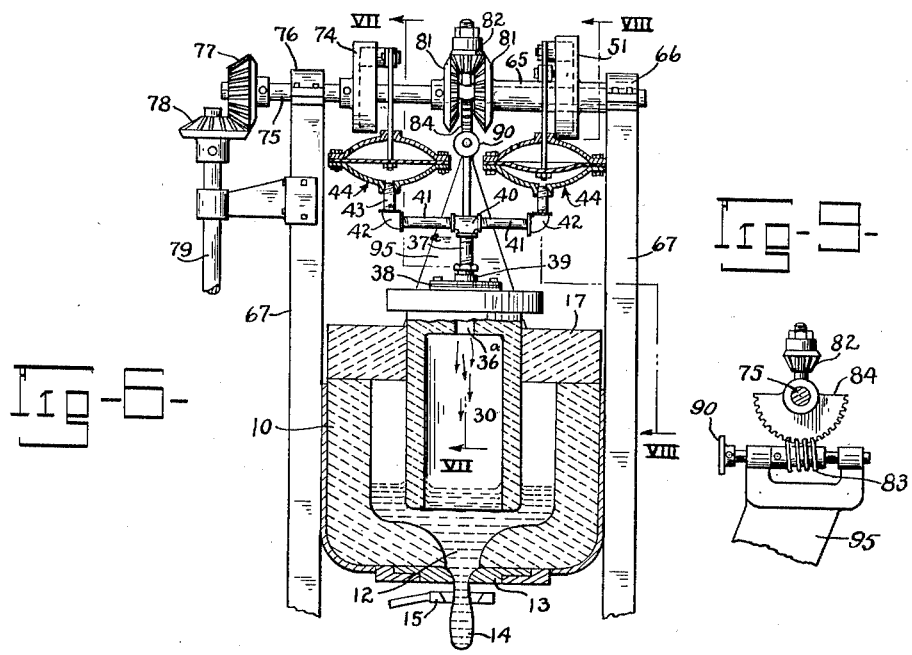
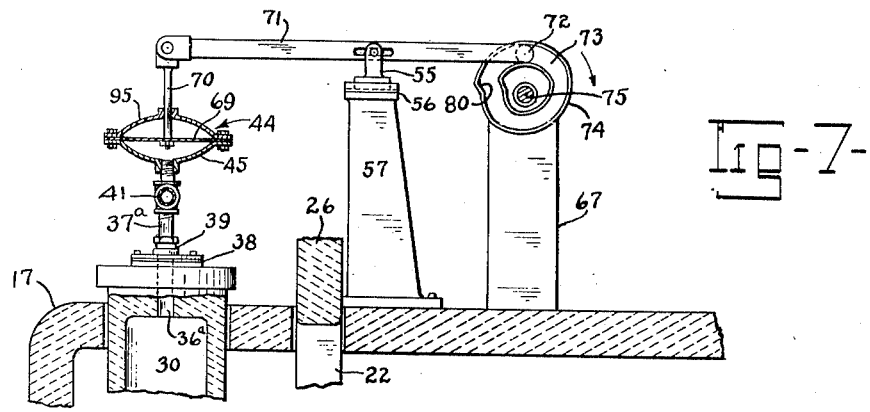
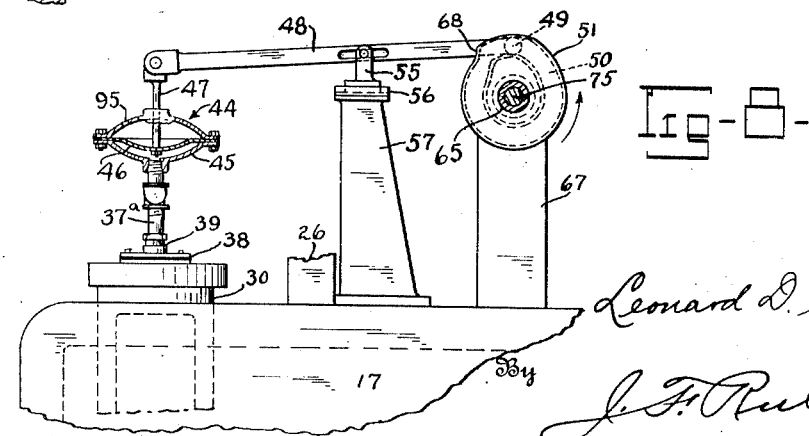

Patented Oct. 15, 1929

1,731,947

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS FEEDER

Application filed June 20, 1927. Serial No. 200,022.

The present invention relates to improvements in glass feeders and particularly to that type embodying a boot or forehearth extending laterally from a tank and provided with a bottom outlet through which the molten glass issues to be formed into mold charges.

An object of the present invention is to provide novel and effective pneumatic means in combination with a rotary glass stirring implement to control the delivery of charges of glass through the bottom outlet orifice.

A further object is to provide in combination with a feeder of the above character, a rotating glass stirring tube located over the bottom outlet and associate with this tube means for applying air pressure and vacuum in alternation to glass within the tube to thereby periodically accelerate and retard flow of glass through the outlet orifice.

A further object is to provide a feeder of the above character embodying means whereby the time interval between the application of vacuum and air pressure to glass over the outlet may be regulated and varied to thereby determine the shape and size of charges suspended from the walls of the outlet orifice.

Other objects will be apparent hereinafter.

In the accompanying drawings:

Fig. 1 is a plan view of the improved feeder.

Fig. 2 is a front elevation of the feeder with parts shown in section.

Fig. 3 is a substantially central vertical longitudinal sectional view of the feeder.

Fig 4 is a sectional view taken substantially on the line IV—IV of Fig. 3.

Fig. 5 is a sectional view taken on the line V—V of Fig. 3.

Figs. 6, 7 and 8 show the manner in which the diaphragms function, elements other than the diaphragms being shown in more or less abbreviated form.

Fig. 6 is a transverse sectional view through the rotating tube and diaphragms showing the latter in position just prior to application of vacuum to retard flow of glass through the outlet.

Fig. 7 is a sectional elevation taken substantially on the line VII—VII of Fig. 6.

Fig. 8 is a sectional elevation taken substantially along the line VIII—VIII of Fig. 6, showing the pressure control diaphragm in position to cause expulsion of glass through the bottom outlet opening.

Fig. 9 is a detail side elevation of the differential adjustment between the cam operating gears.

Referring to the drawings, the feeder comprises a furnace extension 10 extending laterally from a tank 11 or furnace, and forming a boot or forehearth having a bottom outlet opening 12 provided with a bushing 13 through which molten glass issues by gravity. The issuance of glass through the outlet and bushing is alternately accelerated and retarded to form suspended charges 14, which are periodically severed by shears 15 for delivery by gravity to forming molds 16 in which the charges are properly shaped. The boot is provided with a cover 17 whose forward end is stepped upwardly to form a combustion chamber 18 for a purpose hereinafter apparent. A stack 19 is arranged adjacent the inner end of the boot and is provided with a draft control damper 20 by which heat conditions within the boot may be controlled. A gate 21 is positioned between the stack 19 and the tank 11 serving as a skimmer and to prevent passage of heat from the boot into the tank.

A gate 22 arranged at the inner end of the combustion chamber 18 (Fig. 3), serves to close off this chamber from the remaining portion of the boot to a greater or less degree to thereby localize the application of heat to glass in proximity to the bottom outlet opening. The heat is supplied to the chamber 18 by a burner 23 arranged at the inner side of said chamber (Figs. 3 and 4), said burner being connected by a pipe 24 to any suitable source of fuel supply (not shown). This burner is arranged at one side of the boot cover 17, being spaced transversely from a longitudinal passageway or port 25 which provides communication between the chamber 18 and the inner portion of the boot. Auxiliary gates 26 are provided to cooperate with the main gate 22 in completely closing off the chamber 18 from communication with other portions of the feeder. The main gate 22 (Figs. 3, 4 and 5) is of substantially inverted T-shape to prevent interference with the application of heat to the interior of the chamber 18 and the passage of products of combustion from said chamber to the rear portion of the boot to be exhausted through the stack 19.

The glass agitating and flow control means includes a rotary implement projecting into the glass and formed with a downwardly opening chamber, this implement in the present disclosure comprising a tube or sleeve 30 closed at its upper end and carrying at said end a bevel gear 31 running in mesh with a pinion 32 which is fixed to one end of a drive shaft 33 journalled in a bearing 34 on a frame 35 which supports said tube in vertical alignment with the bottom outlet opening 12. This mechanism is operable to cause continuous rotation of the stirring implement. The frame 35 may be vertically adjusted on standards 36 by rotating adjusting screws 37 (Fig. 2). Continuous rotation of the tube 30 serves to agitate the glass, causing uniform temperature conditions throughout the issuing stream from which charges are periodically severed.

The upper end of this tube 30 is formed with a central axial opening $36^a$ which provides communication between the interior of the tube and a combined air pressure and vacuum pipe $37^a$. A plate 38 is fixed to the upper end of the tube and is in turn connected by a swivel 39 to said pipe $37^a$, thereby permitting rotation of the tube independently of the pipe. A T-pipe union 40 is fixed to the upper end of the pipe $37^a$ and is connected to oppositely directed pipes 41 whose outer ends carry elbows 42 from which short pipes 43 extend upwardly for connection to a pair of diaphragms 44 spaced transversely of the boot. These diaphragms may be mounted at the upper ends of supports 27 rising from the boot cover 17. One of these diaphragms operates to apply air pressure to the glass within the rotary tube 30 in alternation with the application of vacuum by operation of the other diaphragm. This alternate application of air pressure and vacuum controls the discharge of glass through the bottom outlet opening and formation of the issued glass into mold charges.

In the present disclosure, the diaphragm at the right of Fig. 6 and shown in detail with its operating connections in Fig. 8, is employed to apply air pressure to the surface of the glass within the rotating tube to thereby accelerate flow of glass through the bottom outlet opening 12. This diaphragm, as well as the other one, includes a casing 45 comprising upper and lower sections bolted together and enclosing a flexible diaphragm 46. The upper section of each housing is formed with an opening 95 preventing air compression above the diaphragms during their operation for obvious reasons. The diaphragm is connected at its center to a rod 47 which extends upwardly through the housing 45 and is pivoted to one end of an operating lever 48 whose other end carries a cam roll 49 running in a continuous trackway 50 on a cam 51. The operating lever 48 is fulcrumed between its ends by a bolt and slot connection to a slide block 55 arranged in guideways 56 at the upper end of a supporting standard 57 rising from the boot 10. A slide block adjusting screw 58 (Fig. 3) has swivel connection to the slide block 55 and is threaded through a bracket 59 on said standard 57. A bevel gear 60 is fixed to the outer end of this adjusting screw and runs in mesh with a gear 61 fixed to the upper end of an operating rod 62 by rotation of which the slide block is moved longitudinally of the lever 48 to thereby change the fulcrum point of said lever and proportionately vary the degree to which the diaphragm 46 is flexed.

The lever control cam 51 (Figs. 6 and 8) is pinned to a sleeve 65 rotatively mounted on a transverse shaft 75 journalled in bearings 66 and 76 at the upper end of the boot supporting units 67. This cam 51 is formed with an offset 68 in the trackway 50 so that the lever 48 is rocked on its fulcrum at predetermined periods to compress the air within the rotating tube 30 and thereby accelerate flow of glass through the outlet opening.

The other diaphragm 44, shown at the left of Fig. 6 and in detail with its operating devices in Fig. 7, is of the same construction as the other diaphragm and includes an operating lever 71, one end of which carries a cam roll 72 running in a trackway 73 on a continuously rotating cam 74. This cam 74 is pinned to said transverse shaft 75 telescoped within sleeve or tube 65, said shaft 75 carrying at its outer end a bevel gear 77 running in mesh with a driving gear 78 fixed to the upper end of the driving shaft 79. The trackway 73 (Fig. 7) is formed with an offset 80 which, due to continuous rotation of the cam 74, serves to periodically rock the lever 71 to apply a certain degree of vacuum or suction to the glass within the rotating tube 30, whereby the issue of glass through the bottom outlet opening is retarded.

From the foregoing, it is seen that alternate operation of the diaphragms, due to continuous rotation of the cams 51 and 74, causes application of air pressure and vacuum or suction to the surface of the glass within the tube 30 in alternation so that issue of glass through the outlet is first accelerated, and then at a predetermined succeeding time interval is retarded. In this manner, formed charges of glass are periodically suspended from the walls of the outlet opening and are severed at proper intervals from the issuing stream by the shears 15.

The feeder is provided with means whereby charges of various sizes and weights may be formed, thereby adapting itself for use in production of different types of ware. This means comprises the provision of a differential timing device located between the cams 51 and 74 (Figs. 1, 2 and 9) and in part freely mounted on the shaft 75. Bevel gears 81 are fixed to the tube 65 and shaft 75 between said cams and have driving connection with each other through a pinion 82 (Figs. 2 and 6). A worm 83 journalled in bearings on the standard 95 runs in mesh with a gear segment 84 suitably connected to the carrier for the pinion 82. An adjusting screw 90 is fixed to one end of the worm 83, which is mounted on a standard 91. By rotating the screw 90, the pinion 82 is moved circumferentially about the axis of the shaft 75, causing a variation in the relative positions of the offsets 68 and 80 on the cams 51 and 74. It is evident that by so changing the relation between these offsets, the time relation between actuation of the diaphragms will be correspondingly varied and thereby increase or decrease the time interval between termination of the application of air pressure and the application of vacuum or suction. In this manner, the size and weight of the suspended charges may be quite accurately regulated.

The shears 15 may be of a type shown in Fig. 2 wherein an air motor 85 is employed to actuate the shears. This air motor is suspended from the boot by an arm 94 and is supplied with air pressure through a pipe 86 connected to an air pressure control valve 87 which is periodically actuated by a continuously rotating cam 88 fixed to the shaft 79 (Fig. 2) which rotates the diaphragm control cams.

In operating the feeder, the stirring tube 30 is continuously rotated and air pressure and suction are applied in alternation to the glass in said tube by actuation of said diaphragms. Assuming that the diaphragms have just arrived at the position shown in Figs. 6, 7 and 8, it is evident that air under pressure is being applied to the surface of the glass in the tube 30 directly over the outlet orifice. Thus an expelling force is applied to the glass.

Immediately following this application of air under pressure, the diaphragm 46 begins a slow downward movement to its normal position thereby applying a low degree of vacuum to the surface of the glass in advance of the more intense application of vacuum by the other diaphragm 69. This slow return of the diaphragm 46 is readily understood by reference to Fig. 8 in which the cam track is shaped to gradually lower the cam roll 49 after air under pressure has been applied to the glass. While the cam 51 (Figs. 6 and 8) is rotating to slowly return the diaphragm 46 to its uppermost position, the other cam 74 is rotating in the opposite direction to bring the offset 80 to a point at which it will suddenly rock the lever 71 about its fulcrum and thereby quickly lift the diaphragm 69. This quick upward movement of the diaphragm 69 applies a positive retarding force to the glass and necks in the upper end of the extruded portion. At this period of operation, the cut-off shears 15 are actuated to sever the suspended charge so that it may be delivered by gravity to a forming mold 16 which at this particular time is disposed below in vertical alignment with the outlet. After a suspended charge has been severed from the supply body the diaphragm 69 begins a slow downward movement from the position shown in Fig. 3 to that shown in Fig. 7, so that a slight pressure is applied to exert an expelling force to the glass. Substantially simultaneously with the arrival of the diaphragm 69 at the Fig. 7 position, the diaphragm 46 is quickly moved downward to apply the final expelling force to the glass. From this point on the operation is similar to that outlined above. As previously pointed out, the size and weight of the formed charges may be readily varied by changing the relative locations of the offsets on the cams shown in Figs. 7 and 8.

Modifications may be resorted to within the spirit and scope of the appended claims.

What I claim is:

1. In a glass feeder, a container for a supply body of molten glass formed with a bottom outlet opening, a continuously rotating glass stirring implement projecting into the glass over said outlet opening and formed with a downwardly opening chamber, a pair of diaphragms communicating with the chamber, and means to operate the diaphragms one at a time to alternately apply air pressure and vacuum to glass in said chamber whereby issue of glass through the bottom outlet opening is alternately accelerated and retarded.

2. In a glass feeder, a container for a supply body of molten glass formed with a bottom outlet opening, a continuously rotating glass stirring implement projecting into the glass over said outlet opening and formed with a downwardly opening chamber, a pair of diaphragms communicating with the chamber, and a pair of continuously rotating cams adapted to actuate the diaphragms one at a time to apply air pressure and vacuum to the glass in said chamber in alternation to thereby regulate issuance of glass through the outlet opening.

3. In a glass feeder, a container for a supply body of molten glass formed with a bottom outlet opening, a continuously rotating glass stirring implement projecting into the glass over said outlet opening and formed with a downwardly opening chamber, a pair of diaphragms communicating with the chamber, a pair of continuously rotating cams adapted to actuate the diaphragms one at a time to apply air pressure and vacuum to the glass in said chamber in alternation and thereby regulate issuance of glass through the outlet opening, and means to change the timed relation between the diaphragm actuating periods of said cams.

4. In a glass feeder, a container for a supply body of molten glass having a bottom outlet opening near one end, means to flow a stream of molten glass to said outlet, a heating chamber formed over the outlet opening, means to introduce heat into said chamber, a gate projecting downwardly into the glass and forming the lower part of one wall of said chamber and separating the chamber from the remaining portion of the feeder, means to adjust the gate vertically to change the extent of projection into the glass, and a closable port in the upper part of said one wall providing communication between said chamber and the remaining portion of the feeder.

5. In a glass feeder, a glass supply tank, a container opening at one end into said tank and having a bottom outlet opening near its other end, a cover for the container having an upwardly stepped portion over said outlet opening, a vertically movable gate cooperating with the upwardly stepped portion of the cover to form a heating chamber directly over said outlet opening, a burner arranged to project a flame into said chamber, a port formed in one wall of the chamber to provide communication between said chamber and the remaining portion of the container, and a gate adjustable to open or close said port.

6. In glass feeding apparatus, the combination of a glass tank, a forehearth extending therefrom and provided with a discharge outlet through which molten glass issues, means including a vertically movable gate dividing said forehearth into front and rear compartments, said front compartment having a bottom outlet through which molten glass is discharged, means for directing a heating flame into said front compartment, means including a port above and separate from said gate for directing the spent gases of combustion into said rear compartment and discharging them therefrom to the outside air, and a gate for controlling the passage of the gases thru the port.

Signed at Toledo, in the county of Lucas and State of Ohio, this 17th day of June, 1927.

LEONARD D. SOUBIER.